United States Patent [19]

Ertle

[11] Patent Number: 4,547,352

[45] Date of Patent: Oct. 15, 1985

[54] RETICULATED PUFFED BORAX HAVING ENHANCED ABSORPTIVE CAPACITY

[75] Inventor: Raymond T. Ertle, Pompton Plains, N.J.

[73] Assignee: Capital City Products Company, Columbus, Ohio

[21] Appl. No.: 524,399

[22] Filed: Aug. 18, 1983

Related U.S. Application Data

[63] Continuation-in-part of Ser. No. 358,050, Mar. 15, 1982, Pat. No. 4,412,978.

[51] Int. Cl.[4] ............................................. C01B 35/12
[52] U.S. Cl. ................................. 423/279; 252/99; 252/135; 252/139; 252/378 R
[58] Field of Search .................. 423/279; 252/378 R, 252/99, 135, 139

[56] References Cited

U.S. PATENT DOCUMENTS

| | | | |
|---|---|---|---|
| 3,533,942 | 10/1970 | Rhees et al. | 252/8.8 |
| 3,538,005 | 11/1970 | Weinstein et al. | 252/99 |
| 3,562,171 | 2/1971 | Guida | 252/186 |
| 3,677,439 | 6/1972 | Corey et al. | 252/99 |
| 3,838,072 | 9/1974 | Smith, Jr. et al. | 252/540 |
| 3,839,214 | 10/1974 | Schwalley et al. | 252/135 |
| 3,986,987 | 10/1976 | D'Souza | 252/135 |
| 4,021,360 | 5/1977 | McLaughlin et al. | 252/135 |
| 4,048,123 | 9/1977 | Hramchenko et al. | 252/135 |
| 4,097,418 | 6/1978 | Rolfes | 252/135 |
| 4,395,347 | 7/1983 | McLaughlin et al. | 252/135 |

*Primary Examiner*—John Doll
*Assistant Examiner*—Jackson Leeds
*Attorney, Agent, or Firm*—Stefan J. Klauber

[57] ABSTRACT

A method is provided for enhancing the absorptive capacity of functional compositions into puffed borax particles. The method comprises contacting the particles with a sufficient amount of a solvent composition, e.g. water, steam, ethylene glycol, capable of dissolving portions of the exterior and interior cellular walls of the particle to thereby form a reticulated puffed borax having enhanced absorptive capacity for the functional composition. The reticulated puffed borax particle comprises a plurality of cells adjacent to each other wherein a major portion of the cell walls have openings therein to interconnect the cells.

16 Claims, 2 Drawing Figures

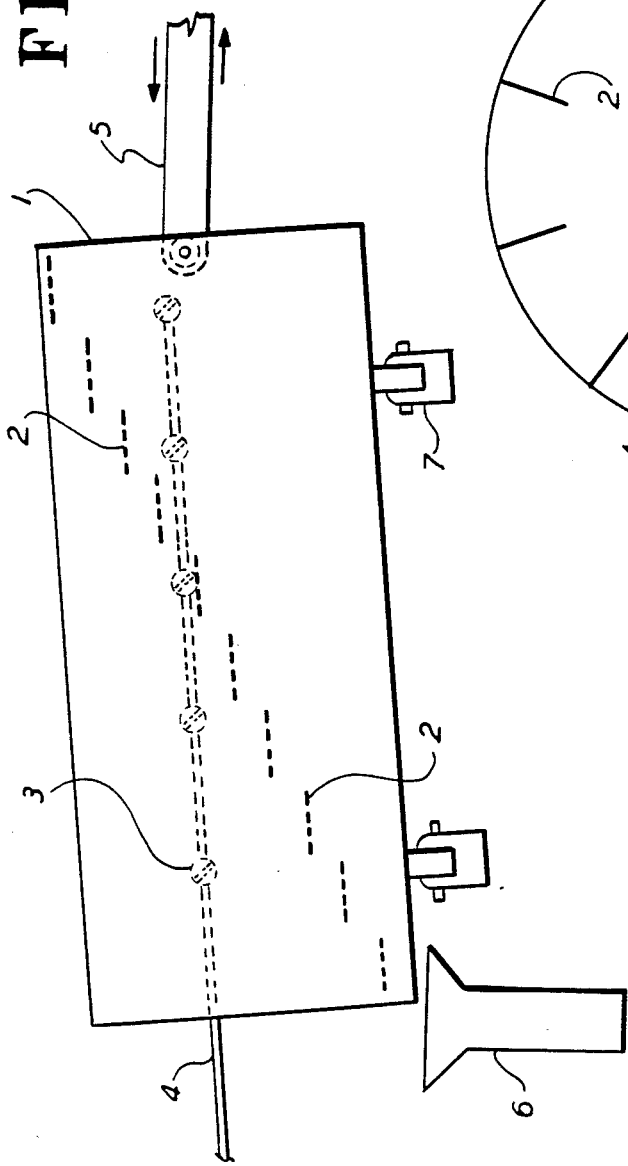
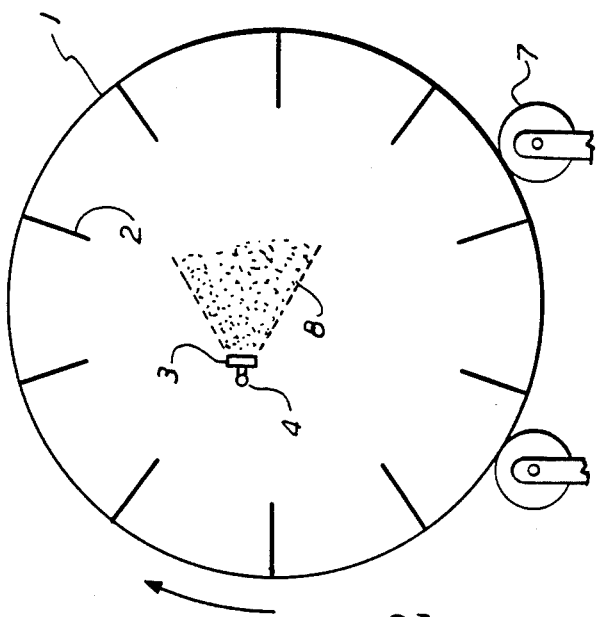

RETICULATED PUFFED BORAX HAVING ENHANCED ABSORPTIVE CAPACITY

RELATED APPLICATION AND DOCUMENTS

This application is a continuation-in-part of my copending application Ser. No. 358,050, field Mar. 15, 1982 and entitled "Method And Apparatus For Manufacturing Improved Puffed Borax" now U.S. Pat. No. 4,412,978. Additionally, the invention described and claimed herein is described in an invention disclosure submitted under the Disclosure Document Program, No. 109596, filed on July 12, 1982.

BACKGROUND OF THE INVENTION

1. Field of the Invention

This invention relates to a method for producing novel reticulated puffed borax having enhanced absorptive capacity for functional compositions.

2. Prior Art

The preparation, properties, and uses of expanded or so-called "puffed" borax, have been described in numerous references. Excellent discussions are set forth in, for example, *Technical Service Bulletin No. 27* (revised September 1971), of Borax Consolidated Limited of London, England; in Bulletin 0171, entitled "*Puffed Borax*" issued October 1973 by Kerr-McGee Chemical Corp., Oklahoma City, OK; and in an article by R. C. Rhees and H. H. Hammar entitled "Puffed Borax" appearing in *Soap And Chemical Specialties*, Vol. XLII, for January 1966 at pages 58–61 and 118–120.

Among other things, these references describe known prior art processes wherein particulate borax pentahydrate particles are rapidly heated to above the melting temperature of the pentahydrate, whereat the borate dissolves in its own water of hydration and the solution erupts through the partially dehydrated crystal surface, resulting in the puffed product.

The resultant puffed product consists of low density particles or beads, which have a high surface area and include large quantities of voids. Generally, each particle is comprised of a plurality of expanded cells adjacent to and attached to each other. By virtue of such structure, large quantities of liquids and/or solids can be loaded onto the expanded borax, rendering such product useful as a bulk carrier in numerous applications. For example, organics such as trichloroethylene, cyclohexanone or pentachlorophenol, and other functional type compositions such as non-ionic, cationic, and anionic surfactants, can be loaded at very high concentrations onto the puffed borax, with the product still retaining its free flowing characteristics. This renders the puffed borax very useful in such diverse compositions as dairy cleaners, fabric softeners, bath additives, etc.

Various techniques have been utilized in the past to effect the desired heating of the borax feed material to produce the puffed borax, see for example, U.S. Pat. No. 4,031,345 to D'Souza, British Pat. No. 629,171, U.S. Pat. No. 3,454,357 Rhees and Hammar, and U.S. Pat. No. 3,882,034 to Gibbons.

Additionally, in applicant's aforementioned parent application U.S. Ser. No. 358,050, an improved method and apparatus are described for producing a puffed borax product having superior particle strength and improved uniformity of hydration and puff ratio. The invention involves introducing particles of borax having a given particle size distribution into a downwardly flowing, slowly moving, laminar airstream in a vertical tower, as a horizontally dispersed sheet of particles. The vertical tower is essentially a conventional spray drying tower which has been suitably modified for use in the process. The airstream is heated sufficiently to remove part of the water of hydration, but not to such a degree as would completely remove the water of hydration or fuse the borax. The borax particles, carried by the airstream, are carried downstream and gravitationally separated. The particles are found to have a more uniform puffing ratio.

Even with applicant's improved process, it is still desirable to have a puffed borax having an enhanced absorptive capacity for functional compositions absorbed therein.

In some of the aforementioned references, rehydration of puffed borax is discussed. Generally, however this involves the addition of the puffed borax to bulk aqueous solutions as opposed to the controlled addition of water by spraying or the like. Additionally these references do not teach or suggest that such rehydration of puffed borax enhances the absorptive capacity of the borax.

In accordance with the foregoing, it may, therefore, be regarded as an object of the present invention, to provide a method for enhancing the absorptive capacity of functional compositions into puffed borax particles.

A further object of this invention is to provide reticulated puffed borax particles having enhanced absorptive capacity for functional compositions.

A still further object of this invention is to provide a method for enhancing the absorptive capacity of functional compositions into puffed borax, the puffed borax being a free-flowing, agglomerate free borax, in which the particles of different sizes are puffed to a more uniform ratio, and have a uniformly high bead strength.

SUMMARY OF THE INVENTION

Now in accordance with the present invention, the foregoing and further objects of the invention are achieved by a method which enhances the absorptive capacity of functional compositions into puffed borax particles. The method comprises contacting the particles with a sufficient amount of a solvent composition capable of dissolving portions of the exterior and interior walls of the particle to thereby form a reticulated puffed borax having enhanced absorptive capacity for the functional compositions. The reticulated puffed borax particle produced comprises a plurality of cells adjacent to each other wherein a major portion of the cell walls have openings therein to interconnect the cells.

BRIEF DESCRIPTION OF THE DRAWINGS

In the drawings appended hereto;

FIG. 1 is a schematic elevation view of an apparatus arrangement suitable for use in treating puffed borax according to the present invention; and FIG. 2 is an end elevation view of the apparatus of FIG. 1, the view again being schematic in nature.

Typical functional compositions which are absorbed into the reticulated puffed borax of the invention, include organic liquids, and organic solids, and inorganic solids. The compositions of interest may e.g. function as cleaners, germicides, sanitizers, preservatives, herbicides, etc., either separately or in combination.

DETAILED DESCRIPTION OF THE INVENTION

The puffed borax which is treated by the method of this invention may be produced by any of the known methods of producing puffed borax, for example, as described in the aforementioned patents to D'Souza, British Pat. No. 629,171, Rhees and Hammar, and Gibbons, the entire disclosures of which are incorporated herein by reference. Preferably, however, the puffed borax is produced by the method described in applicant's parent application, U.S. Ser. No. 358,050. In this application the puffed borax is produced by introducing particles of borax having a given particle size distribution into a downwardly flowing, slowly moving, laminar airstream in a vertical tower, as a horizontally dispersed sheet of particles. The vertical tower is essentially a conventional spray drying tower which has been suitably modified for use in the process. The airstream is heated sufficiently to remove part of the water of hydration, but not to such a degree as would completely remove the water of hydration or fuse the borax. The borax particles, carried by the airstream, are carried downstream, and gravitationally separated. The resultant product is free-flowing and agglomerate-free and exhibits high bead strength.

Pursuant to the method described in U.S. Ser. No. 358,050, a more uniform puffing ratio is achieved because smaller particles in the feed descend in the cocurrent laminar airstream at a velocity which is closer to that of the larger particles than occurs in prior art processes utilizing spray towers. These smaller particles are thus subjected to less residence time in the puffing zone. Consequently, the smaller particles are puffed or expanded in more nearly the same ratio to that of the larger particles.

Preferably, the height of the tower, and the temperature and velocity of the airstream, are such as to prevent complete dehydration, or fusing of the borax, and are such that they produce a product with a relatively uniform puffing ratio. It has been found that a stream velocity of less than about five feet per second and an air temperature of between about 500° F. to 750° F. at the air inlet yields best results for a tower in which the fall zone for the borax feed powder is between 40 and 60 feet.

The borax feed powder is preferably introduced at the top of the tower as a dispersed flat sheet, by a rotating horizontal wheel having vanes which disperse the borax particles through an opening in the wall of the tower into the moving airstream. Two or more such wheels can be used. The particles in the form of a sheet are carried by the airstream, and puffed particles are recovered downstream by gravitational separation. The resulting product is free-flowing and agglomerate free. It requires no further treatment to render it free-flowing, or reduce particle size.

As indicated in U.S. Ser. No. 358,050, a certain amount of rehydration beneath the puffing zone occurs, producing an improved, more uniform product. Applicant has now discovered that if the puffed borax is further treated by the method described herein, the puffed borax produced has an enhanced absorptive capacity for functional compositions absorbed therein. Such compositions typically absorbed by puffed borax are, for example, both aliphatic and aromatic organics, such as trichloroethylene, cyclohexanone, and pentachlorophenol, methanol and other alcohols, petroleum fractions, and mixtures of the foregoing.

The method of this invention comprises contacting the puffed borax with a solvent composition. Typical solvent compositions which may be utilized in this invention are ethylene glycol and glycerol. Preferred solvent compositions are water, in the form of a water mist or steam. If steam is utilized, reticulation of the puffed borax only occurs when the water vapor condenses to liquid before or simultaneous to contact with the puffed borax. Water, as a true vapor will only be "taken up" by the puffed borax in the form of water by hydration without reticulating the borax. Aqueous solutions of surfactants or inorganic compounds such as sodium chloride, sodium tripolyphosphate, sodium sulfate, sodium borate, etc. may also be used as the solvent composition. The dissolved component in such case may comprise the functional composition, which upon drying of the reticulated puffed borax, is retained in the resultant cellular product.

The amount of solvent composition which is utilized is an amount which is sufficient to dissolve portions of the exterior and interior cell walls of the puffed particles to thereby form a reticulated puffed borax. If an amount too great is used, then the particle structure will be destroyed to such an extent that the puffed borax is useless as an absorbent. If too little is utilized, the amount of enhancement is negligible. Preferably, when utilizing water as a solvent composition, the amount utilized is from about 0.1% to about 45% of the weight of the puffed borax, and most preferably about 5% to about 25%.

The temperature at which the puffed borax is contacted with the solvent composition depends on the solvent composition utilized. For example, when water is utilized as the solvent composition, it is preferred that it be in fine mist form. When such water mist or spray is utilized, it is preferred that the temperature be about 15° C. to 50° C., although it should be appreciated that other temperatures may be utilized which will require a greater or lesser degree of contact time with the solvent composition.

FIGS. 1 and 2 schematically depict a preferred embodiment of an apparatus utilized to contact puffed borax with a solvent composition such as a water mist. In this apparatus the puffed borax is fed by feed belts to a canted tumbling drum 1 which is rotated on rollers 7 (by means not shown). Fine droplets of water or steam are sprayed onto the borax utilizing a series of nozzles 3 fed via line 4. The borax is lifted and distributed into the spray pattern 8 by the staggered baffles 2. The reticulated puffed borax exits from drum 1 at the left side thereof and flows into collector 6. From the collector 6 the reticulated borax is transported to a packaging hopper (not shown). It will be appreciated that various mixer/nozzle configurations in addition to that depicted, can be used. Reticulation can even be accomplished by spraying onto puffed borax on a moving belt, provided proper contact and coverage is achieved.

The method of this invention produces reticulated puffed borax particles, each particle comprised of a plurality of expanded cells adjacent to and attached to each other. A major portion of the cell walls have openings therein to thereby interconnect the cells. The puffed borax prior to treatment by the method of this invention is comprised of a plurality of cells adjacent to and attached to each other. The walls are substantially whole, i.e. there are very few holes penetrating the cell walls. After treatment by the method of this invention, the cell walls have openings therein which provide for the interconnection of adjacent cells, to thereby provide for enhanced absorption of the functional composition into the cellular voids.

It has been found that the method of this invention does not detrimentally affect the size distribution or density of the puffed borax. Density tends to increase slightly after treatment by the method of this invention, but this may be compensated for by starting with a less dense puffed borax so that the desired final density may be obtained. Prior to treatment, a typical particle diameter is from 420 to 1,000 microns and remains substantially the same after treatment. However, it has been found that the available void volume of the reticulated puffed borax has been increased to over 3 cm$^3$/g, typically to about 3.5 cm$^3$/g, compared to less than 2.2 cm$^3$/g prior to treatment by the method of this invention. Tests show that the absorptive capacity of the reticulated product of the invention is considerably increased over the non-reticulated prior art product.

Typically, and preferably, the functional compositions are absorbed into the puffed borax after it has become reticulated. It has been found, however, that the reticulated puffed borax of this invention may be made in situ while absorbing the functional composition. If, for example, the nontreated puffed borax is mixed with an amount of functional composition for absorption which is excessive to the amount typically absorbed by such puffed borax, and then one adds the solvent composition, it has been found that the solvent composition breaks through the cellular wall composition to produce the reticulated puffed borax which thereby absorbs the excess functional composition.

If the functional composition comprises an inorganic or organic solid, it is also possible to absorb or deposit the solids within the reticulated cells of the puffed borax by physically mixing the puffed borax with the powdered functional solids.

In a further embodiment of the invention, a composition comprising an emulsion or solution of a functional component in a suitable solvent for the borax, may be used to simultaneously reticulate and apply the functional component to the puffed borax. Such composition may include suitable emulsifiers as are known in the art. The functional component in this instance may e.g. comprise a functional organic liquid.

It is theorized that the contact of the borax with the solvent composition causes a "reticulation." It is believed that the method of this invention opens up the blister-type skin separating the cellular voids. As a consequence, the particle interiors become completely reticulated; i.e., the various cells are interconnected and the webs are broken or punctured, with the result that a functional composition, particularly oils or the like, may then be absorbed much more readily into the puffed borax particles. The net result is that the puffed borax is this invention, in a preferred embodiment, is capable of absorbing at least about 150% the amount of functional composition compared to non-treated puffed borax while still remaining physically handleable.

The following Examples are illustrative of the invention and are not to be considered as limiting.

EXAMPLE I

Reticulated puffed borax samples in accordance with the present invention were prepared by utilizing as the puffed borax feed to the apparatus of FIGS. 1 and 2, a product produced in accordance with my copending Ser. No. 358,050 application. This feed material is available commercially from the Industrial Products Group of Stokley-Van Camp Inc. under the tradename EX-BOR ™. The drum 1 of FIGS. 1 and 2 had a length of 20 feet and diameter of 6 feet, and the puffed borax was fed through same at the rate of 4,000 lbs. per hour. Product temperature in the drum was maintained at about 150° F. Water was introduced as a fine mist through nozzles 3 at a dosage rate of 20% of the weight of the puffed borax feed.

The resultant reticulated puffed borax product was initially compared to the feed material by being examined under a stereo microscope at 2500 power. This disclosed that treatment by the method of this invention opened up or destroyed the "blisters" evident in the feed material, so as to render the pores more accessible.

The treated samples were then compared to the feed material in terms of density and size distribution. The puffed borax feed material had a density of 0.20 g/cm$^3$; the reticulated product had a density of 0.21 g/cm$^3$. The size distribution of each was substantially identical, as follows:

TABLE I

|  | Screen Size | Percentage |
| --- | --- | --- |
| on 20 mesh | (840 microns) | 12.41 |
| on 30 mesh | (590 microns) | 63.10 |
| on 40 mesh | (420 microns) | 21.24 |
| on 60 mesh | (250 microns) | 2.63 |
| on 100 mesh | (149 microns) | .38 |
| on 200 mesh | (74 microns) | .20 |
| through 200 |  | .04 |

EXAMPLE II

In this Example the angle of repose was compared for untreated puffed borax and for samples reticulated in accordance with the present invention. By "angle of repose" I refer to the base angle of the approximately cone-shaped mound which is formed when the powder-like material to be evaluated is poured onto a plane surface from an overhead point spaced a given distance from the plane. A very free flowing material will form into a wide-based cone with little height—and thus with a relatively low angle of repose, while a relatively poor flowing material will form into a narrow based, high cone with a relatively high angle of repose. Thus the angle of repose is an accurate measure of the "free-flow" characteristics of the material.

When puffed borax is treated with an oily composition intended to be absorbed by the puffed borax, the degree of absorption will directly affect the free-flow characteristics of the treated product. Therefore the angle of repose may also be regarded as an accurate measure of the absorptive capacity of the puffed borax.

In the present procedure the samples to be evaluated were all prepared from a starting puffed borax having a density of 20 g/cm$^3$. Portions of this material were treated as in Example I to produce reticulated puffed borax with a density of 0.21 g/cm$^3$, and in some instances a liquid non-ionic surfactant was sprayed on to the reticulated samples. All such samples were evaluated by being poured through a funnel having a discharge spout diameter of 0.0625 inches onto white paper spaced 1.75 inches below the funnel discharge point.

Method:

1. Use 50 ml of treated or untreated Puffed Borax and pour slowly through funnel to form highest peak possible.
2. Measure height of peak from paper, and measure diameter of base of puffed borax mound.
3. Use formula: h/r=tan A, where
   A=angle of repose
   h×height of peak from paper
   r=radius of base
4. Four tests were carried out for differing samples, with the following results:

TABLE II

| Material | Angle of Repose A |
| --- | --- |
| (1) Puffed borax feed material (control) | 24° |
| (2) Puffed borax with 25% nonionic added | 74° |
| (3) Puffed borax with 25% nonionic added first, and then 20% H$_2$O applied as fine mist | 36° |
| (4) Puffed borax with 20% H$_2$O added as fine mist to reticulate and then 25% nonionic added | 29° |

By comparing the above angles of repose, it is evident that the absorptive capacity of the reticulated puffed borax in (3) and (4) is greatly increased in comparison to the unreticulated puffed borax in (2). Indeed the reticulated puffed borax of (4) even with 25% non-ionic liquid added has free-flow properties quite similar to the control material.

EXAMPLE III

Available Void Volume

Both borax, and puffed borax, are insoluble in isopropyl alcohol. The difference in available void volume (AVV) between reticulated and non-reticulated puffed borax was determined by adding a measured volume of puffed borax to a measured volume of the non-solubilizing liquid, subjecting the resultant mixture of ultrasound to cause release of entrained air, and measuring the resultant volume. The difference in volume drop between reticulated and non-reticulated puffed borax indicates the difference in AVV of the two materials. Results are reported as volume of liquid absorbed per volume of puffed borax, demonstrating the amount of liquid absorbed by the puffed borax under saturation conditions.

In this Example, approximately 50 cm$^3$ of the puffed borax samples were added to a 250 cm$^3$ graduated cylinder and the exact volume noted. A measured volume of 50 cm$^3$ of anhydrous isopropyl alcohol was then added to the cylinder, and the cylinder placed in an 80 KHz ultrasonic bath containing 2.5 inches of water at ambient temperature. The ultrasonic generator was activated for 15 seconds, followed by a one minute waiting period to allow the escape of released air. The generator was again activated for 15 seconds, followed by a one minute waiting period to allow the escape of released air. The generator was again activated for 15 seconds, and after an additional minute at rest, the total volume in the cylinder was noted.

Results are reported as:

$$\frac{(\text{alcohol volume} + \text{puffed borax volume}) - \text{final volume}}{\text{puffed borax volume}}$$

The same reticulated and non-reticulated puffed borax samples which were used in the angle of repose tests of Example II were used in these AVV tests. The results are set forth in Table III:

TABLE III

| Material | Volume of Puffed Borax in cm$^3$ | Volume of Alcohol in cm$^3$ | Total Volume | Resultant Volume | Volume Decrease | Ratio of cm$^3$ decrease to cm$^3$ puffed borax sample |
| --- | --- | --- | --- | --- | --- | --- |
| Non-reticulated Puffed Borax | 54 | 50 | 104 | 80 | 24 | 0.444 |
| Reticulated Puffed Borax | 56 | 50 | 106 | 66 | 40 | 0.714 |

The available void volume of the reticulated puffed borax is seen to be 161% that of the non-reticulated puffed borax.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly the invention is to be broadly construed, and limited only by the scope and spirit of the claims now appended thereto.

I claim:

1. A method for enhancing the absorptive capacity of puffed borax particles, comprising contacting the particles with a sufficient amount of a composition consisting essentially of water to dissolve portions of the exterior and interior cellular walls of the said particles to thereby form a reticulated puffed borax having enhanced absorptive capacity.

2. A method for absorbing a functional composition into puffed borax particles comprising in sequence the steps of:
   (a) contacting the particles with a sufficient amount of water to dissolve portions of the exterior and interior cellular walls of the particles to thereby form reticulated puffed borax having enhanced absorptive capacity for the functional composition; and
   (b) contacting the reticulated puffed borax with an amount of the functional compositions to be absorbed.

3. A method for absorbing a functional composition into puffed borax particles comprising in sequence the steps of:
   (a) contacting the puffed borax with an amount of the functional composition to be absorbed; and
   (b) contacting the so contacted particles with a sufficient amount of water to dissolve portions of the exterior and interior cellular walls of the particles to thereby form reticulated puffed borax having an enhanced absorptive capacity for the functional composition.

4. A method for absorbing a functional composition into puffed borax particles, comprising:
   contacting the puffed borax particles with an amount of the functional composition to be absorbed, and separately and in the presence of said functional composition, contacting the particles with a sufficient amount of water to dissolve portions of the exterior and interior cellular walls of the particles to thereby form reticulated puffed borax having enhanced absorptive capacity for the said functional composition.

5. The method of claims, 1, 2, 3 or 4 wherein the water is provided as a vapor.

6. The method of claims, 1, 2, 3 or 4 wherein contacting of the particles with water is effected by spraying the puffed borax with water.

7. The method of claims, 1, 2, 3 or 4 wherein contacting of the particles with water is effected by spraying the puffed borax with steam.

8. A method in accordance with claims, 1, 2, 3 or 4 wherein said functional composition comprises an organic liquid.

9. A method in accordance with claims 1, 2, 3 or 4 wherein said functional composition comprises an organic solid.

10. A method in accordance with claims, 1, 2, 3 or 4 wherein said functional composition comprises an inorganic solid.

11. A reticulated puffed borax particle comprised of a plurality of cells adjacent to each other, wherein a major portion of the cell walls have openings therein to thereby interconnect the cells.

12. The reticulated puffed borax of claim 11, wherein the particle has a diameter of from about 50 to 1,000 microns.

13. The reticulated puffed borax of claim 11 or 12, having a void volume of at least about 3 $cm^3$/gram of borax.

14. A method for absorbing a functional composition into puffed borax particles comprising:

contacting the particles with an emulsion of said functional composition with water, said particles being conducted with a sufficient amount of water to dissolve portions of the exterior and interior cellular walls of the particles to thereby form reticulated puffed borax having enhanced absorptive capacity for the functional composition.

15. A method in accordance with claim 14 wherein said emulsion includes emulsifying agents.

16. The product of the process of claims 1, 2, 3, 14 or 15.

* * * * *

UNITED STATES PATENT AND TRADEMARK OFFICE
CERTIFICATE OF CORRECTION

PATENT NO. : 4,547,352
DATED : October 15, 1985
INVENTOR(S) : Raymond T. Ertle

It is certified that error appears in the above-identified patent and that said Letters Patent are hereby corrected as shown below:

Column 1, line 7; the word "field" should read -- filed --.

Column 7, line 8; the phrase "h X height of peak from paper" should read -- h = height of peak from paper --.

Signed and Sealed this

Eleventh Day of February 1986

[SEAL]

Attest:

DONALD J. QUIGG

Attesting Officer

Commissioner of Patents and Trademarks